Nov. 7, 1950 J. N. WEILAND 2,529,121
FLUID ACTUATED CLUTCH AND BRAKE MECHANISM
Filed Sept. 4, 1947 3 Sheets-Sheet 2

INVENTOR.
JOHN N. WEILAND
BY
Gustav A. Wolff
ATT.

Nov. 7, 1950 J. N. WEILAND 2,529,121
FLUID ACTUATED CLUTCH AND BRAKE MECHANISM
Filed Sept. 4, 1947 3 Sheets-Sheet 3
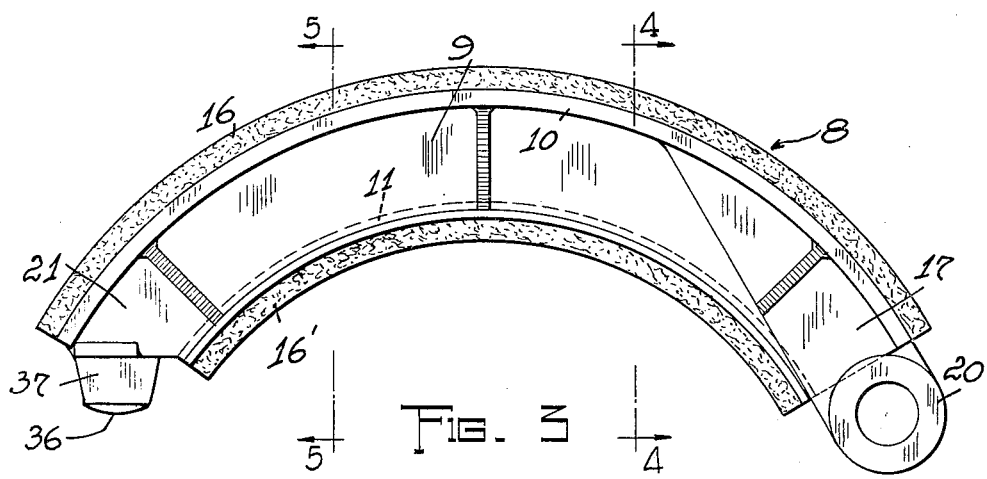
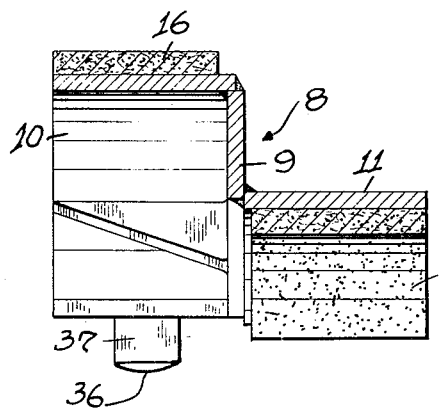
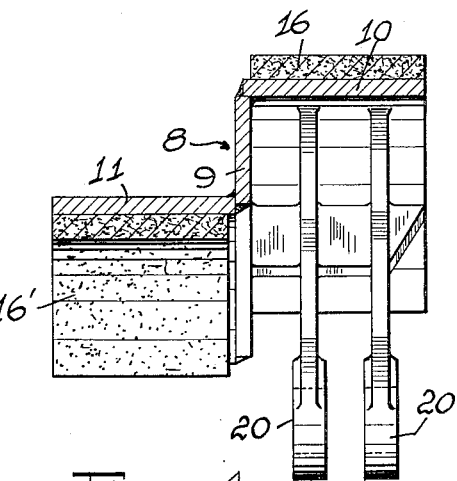
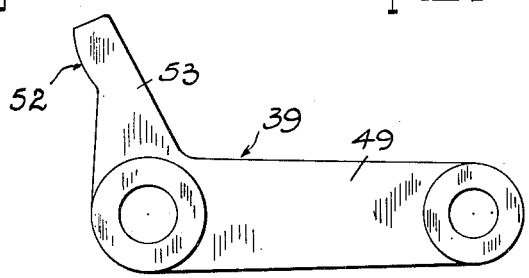
INVENTOR.
JOHN N. WEILAND
BY
Guster A. Wolff
ATT.

Patented Nov. 7, 1950

2,529,121

UNITED STATES PATENT OFFICE 2,529,121

FLUID ACTUATED CLUTCH AND BRAKE MECHANISM

John N. Weiland, Cleveland, Ohio, assignor to The Cleveland Punch & Shear Works Co., Cleveland, Ohio, a corporation of Ohio Application September 4, 1947, Serial No. 772,117

12 Claims. (Cl. 192—17)

This invention relates in general to clutch mechanism for selectively coupling a driving element with different devices and, more particularly, to clutch and brake mechanism for power presses and other driven machines of the type described in Patent No. 2,458,664, dated January 11, 1949 and in co-pending application Serial Nos. 768,386, filed August 13, 1947 and 778,224, filed Oct. 6, 1947, in which clutch mechanism transmits motion and energy of driven fly-wheels to parts to be driven and brake mechanism arrests the motion of the driven parts.

The primary object of the present invention is the provision of a fluid-operated clutch mechanism for machines of the type referred to above, which mechanism embodies a friction shoe clutch assembly mounted on the part to be controlled so as to be positioned between a driving element and a second element arranged in axial alignment with respect to the driving element, the assembly including fluid operated and spring operated means coupled with friction shoe members for frictionally coupling the part to be driven with the driving element when the fluid operated means are activated and frictionally coupling the part to be driven with the second element by the spring operated means when the fluid operated means are inactive.

Another object of the invention is the provision of a fluid operated clutch and brake mechanism for machines of the type referred to above, which mechanism embodies a frictional clutch and brake assembly mounted on the part to be controlled so as to be positioned between a driving element and a brake drum member axially aligned with the driving element, the assembly including clutch and brake shoe members coupled by lever arrangements with fluid operated and spring operated means for frictionally coupling the part to be controlled with the driving element when the fluid operated means are actuated and automatically, frictionally couple the part to be controlled with the brake drum when the fluid operated means are inactive.

A further object of the invention is the provision of a fluid operated clutch and brake mechanism for machines of the type referred to above, which mechanism embodies a frictional clutch and brake assembly mounted on the part to be controlled, the assembly including pivotally supported unitary clutch and brake shoe means actuated upon by fluid and spring operated shifting devices, so that the fluid operated devices when actuated effect shifting of the clutch and brake shoe means in one direction and the spring operated means effect shifting of the clutch and brake shoe means in the opposite direction when the fluid operated devices are inactive.

Still another object of the invention is the provision of a fluid operated clutch and brake mechanism for machines of the type referred to above, which mechanism embodies a frictional clutch and brake assembly mounted on the part to be controlled, the assembly including unitary clutch and brake shoe means pivotally supported at one end and fluid and spring actuated shifting devices coupled with the other end of said clutch and brake shoe means, the fluid and spring actuated means counteracting each other and being dimensioned to effect shifting of the brake shoe means in one direction by operation of the fluid actuated shifting means and shifting of the brake shoe means in the opposite direction by the spring actuated means when the fluid actuated shifting means are inactive.

With the above and other incidental objects in view which will appear hereinafter, the invention consists in certain other novel features of construction and combination of parts all as set forth in the appended claims; and a preferred form of embodiment of the invention is hereinafter shown with reference to the drawings accompanying and forming part of the specification.

In the drawings:

Fig. 3 is a side view of one of the unitary clutch and brake shoe members.

Fig. 4 is a cross-sectional view on line 4—4 of Fig. 3; and

Fig. 5 is a cross-sectional view on line 5—5 of Fig. 3.

Fig. 6 is a side view of one of the levers coupling the spring actuated shifting means with the clutch and brake shoe members.

Figure 1:
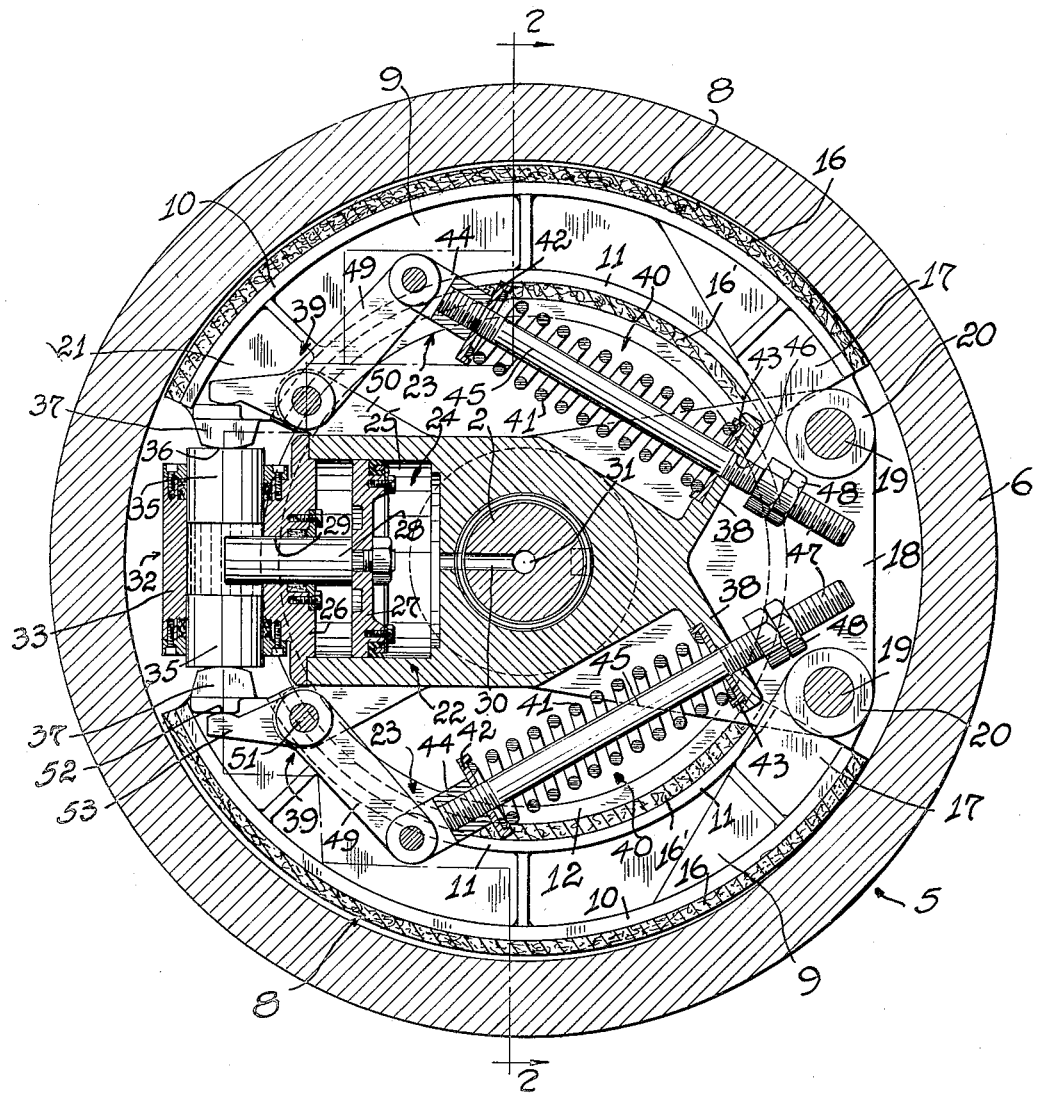
Fig. 1 is a transversal sectional view through a fluid operated clutch and brake mechanism constructed in accordance with the invention, the mechanism being shown attached to and coupled with the driven shaft and flywheel of a power driven machine, such as a power press, with the section taken on line 1—1 of Fig. 2 of the drawings.
Figure 2:
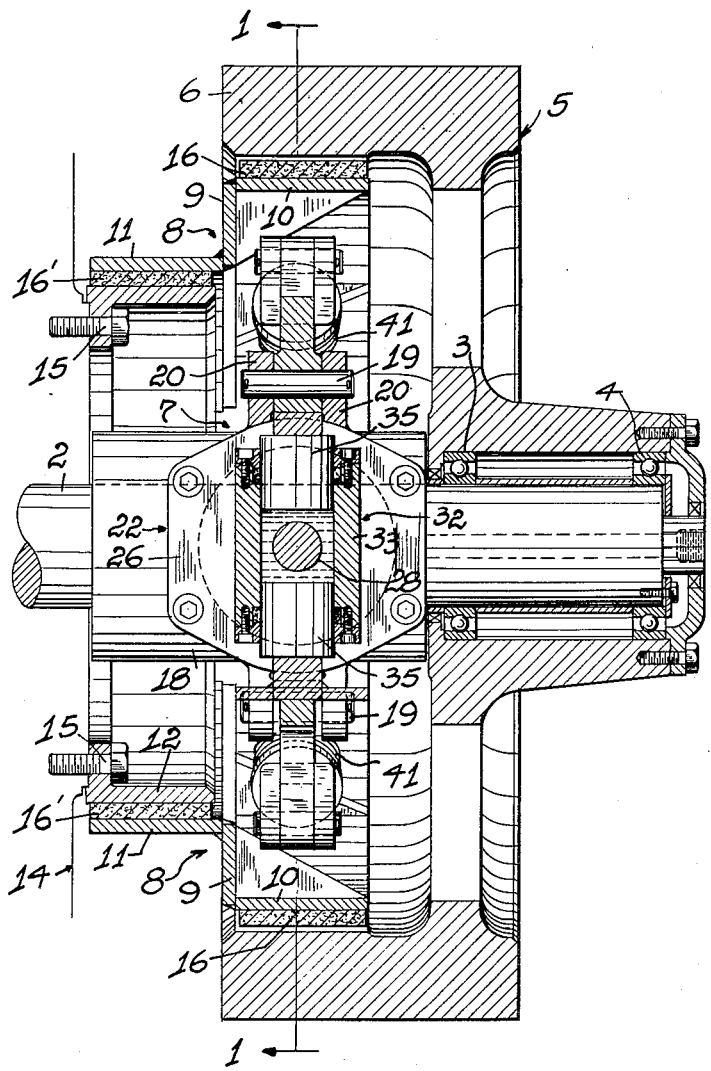
Fig. 2 is a transversal cross-sectional view through the fluid operated clutch and brake mechanism shown in Fig. 1, the section being taken on line 2—2 of Fig. 1.

Referring now in detail to the exemplified form of the invention shown in the drawings, reference numeral 2 denotes the crank shaft of a power driven machine, such as a power press, which shaft freely rotatably mounts in roller bearings 3 and 4 a fly-wheel 5 driven in any suitable manner. The fly-wheel has the inner cylindrical surface of its rim portion 6 smoothly finished and forms the friction clutch drum member for a combined clutch and brake mechanism 7 which is mounted on crank shaft 2. Clutch and brake mechanism 7 includes oppositely arranged shiftable clutch and brake shoe members 8, each of which embodies an arcuate base or web portion 9 and arcuate flanges 10 and 11 extended laterally from opposite edges of web portion 9 in opposite directions so that flange 10 extends into fly-wheel 5 for clutching engagement with rim portion 6 and flange 11 extends opposite a brake drum 12 for braking engagement with its peripheral surface, which drum is secured to frame 14 of the power driven machine by bolts 15.

The clutch and brake shoe members are identical in construction, have their flanges 10 and 11 lined with brake lining 16, 16' and are hingedly connected with their one end portions 17 to base member 18 of the clutch and brake mechanism 7. The hinge connection is effected by short pins 19 arranged in base member 18 and extended through ears 20 on clutch and brake shoe members 8. The other end portions 21 of these members are actuated upon by a fluid operated device 22 and two symmetrically arranged spring controlled devices 23, all of which devices control clutching and braking action of members 8. Fluid operated device 22 consists of a cylinder-piston arrangement 24 with a cylinder 25 formed by a cylindrical recess in base 18. This recess is closed by a specific cover member 26 and slidably mounts a piston 27 having a piston rod 28 extended through a bore 29 in cover member 26. Cylinder 25 communicates through a passage 30 with a passage 31 in crank shaft 2, which passage permits feeding of fluid into cylinder 25 and discharge of fluid therefrom.

The cover member 26 also forms the body of a hydraulic device 32 which directly actuates upon the end portions 21 of clutch and brake shoe members 8. This hydraulic device includes a cylinder 33 open at its opposite ends. Cylinder 33 slidably mounts two symmetrically arranged pistons 35 shifted outwardly in opposite directions when the liquid in cylinder 33 is displaced by piston rod 28 on piston 27. Thus, piston rod 28 acts as a hydraulic ram for hydraulic device 32 when the piston 27 is shifted by fluid fed into cylinder 25 through passage 30 and forces piston rod 28 through bore 29 into cylinder 33. Proper contact between pistons 35 and end portions 21 of clutch and brake shoe members 8 is facilitated by curved contact surfaces 36 on bosses 37 arranged at the said end portions of the clutch and brake shoe members.

Spring controlled devices 23 are coupled with base member 18, provided for such purpose with symmetrically arranged, perforated extensions 38 angularly related to the longitudinal axis of the base member. The spring controlled devices each include a lever member 39 and a pretensioned spring arrangement 40 coupled with member 39 and embodying a compression spring 41 between two spring seat washers 42, 43 which abut the respective perforated extension 38 and a clevis 44 threadedly engaged with a guide rod 45. This guide rod is slidably extended through the perforation 46 in said perforated extension and carries on its threaded end 47 nut members 48 facilitating assembly of the pretensioned spring arrangement 40. Spring arrangement 40 has its clevis 44 coupled with the longer arm 49 of lever member 39 pivoted to a rib-like extension 50 on base member 18 by a pin 51, which lever member engages with the rounded contact face 52 of its shorter arm 53 the rear face of boss 37 on the respective clutch and brake shoe member 8.

Fluid operated device 22, when actuated by fluid under pressure fed into cylinder-piston arrangement 24, effects outward shifting of the pivotally supported clutch and brake shoe members 8 until the lined flanges 10 of such members clutchingly engage with the friction clutch drum member formed by the inner cylindrical surface of the rim portion 6 of fly-wheel 5. Such outward shifting of the clutch and friction shoe members is effected against the tension of the compression springs of pretensioned spring arrangements 40 and effects an increase in the tension of the springs, so that release of the fluid pressure in cylinder-piston arrangement 24 causes automatic shifting of the clutch and brake shoe members by spring controlled devices 23 in opposite direction until lined flanges 11 of such members engage brake drum 12.

In machines with continuously freely rotatably mounted driven fly-wheels the clutch and brake mechanism is mounted on the crank shaft. Starting operations on such machines is effected when fluid under pressure is fed into the cylinder 33 causing shifting of piston 27, a hydraulic ram action of piston rod 28 in hydraulic device 32, outward shifting of pistons 35 and outward shifting of the clutch and brake shoe members to clutching engagement of flanges 10 with the rim portion of the fly-wheel. In such a clutching position members 8 have their flanges 11 disengaged from frictional contact with brake drum 12 and pretensioned spring arrangements 40 have their pretensioned compression springs 41 additionally tensioned. Disengagement of the clutching action of flanges 10 with rim portion 6 is effected by release of fluid from cylinder 33 in any customary manner, as springs 41 then effect rotation of lever members 39 in an anti-clockwise direction in which these lever members shift the flanges 11 of the clutch and brake shoe members 8 into frictional contact with brake drum 12 and stop rotation of base member 18 and shaft 2 supporting same.

Having thus described my invention, what I claim is:

1. A clutch and brake mechanism embodying two axially aligned circular members, rotary means associated with said circular members in axial alignment therewith, friction shoe members pivoted at their one end portions to said rotary means and including flanges arranged to align with said circular members, fluid-operated shifting means on said rotary means engaged with the other end portions of said friction shoe members and effecting rocking of said friction shoe members in one direction to frictionally engage one of said circular members, and spring-actuated shifting means engaged with the said other end portions of said friction shoe members and effecting rocking of said friction shoe members in an opposite direction to frictionally engage the other one of said circular members when said fluid-operated shifting means are inactivated.

2. A clutch and brake mechanism embodying two axially aligned circular members, rotary means associated with said circular members in axial alignment therewith, friction shoe members pivoted with their one end portions to said rotary means and including oppositely extended flanges arranged to align with said circular members for cooperation therewith, fluid-operated shifting means, and spring actuated shifting means, said fluid-operated shifting means engaging the other end portions of said friction shoe members and effecting rocking of said friction shoe members in one direction to frictionally engage their one flanges with one of said circular members, and said spring-actuated shifting means engaging the said other end portions of said friction shoe members and effecting rocking of said friction shoe members in the opposite direction to frictionally engage their other flanges with the other one of said circular members when said fluid-operated shifting means are inactivated.

3. A clutch and brake mechanism embodying two axially aligned circular members, rotary means associated with said circular members in axial alignment therewith, friction shoe members pivoted with their one end portions to said rotary means and including flanges arranged to align with said circular members, fluid-operated shifting means on said rotary means engaged with the other end portions of said friction shoe members and adapted to shift same in one direction, and spring-actuated shifting means on said rotary means engaged with the said other end portions of said friction shoe means and adapted to rock same in the opposite direction, said fluid-operated shifting means including a hydraulic device having shiftable piston means slidably engaged with the said other end portions of said friction shoe members.

4. A clutch and brake mechanism as described in claim 3, wherein said spring-actuated shifting means includes pretensioned spring assemblies and double lever members pivotally supported by said rotary means and slidably engaged with the said other end portions of said friction shoe members, each of said double lever members having its one arm pivotally connected with one of the pretensioned spring assemblies and its other arm slidably engaged with the said other end portion of the respective friction shoe member.

5. A clutch and brake mechanism as described in claim 4, wherein the lever arms of said double lever members differentiate in length, wherein the longer one of said lever arms is coupled with the respective pretensioned spring assembly, and wherein the shorter one of said lever arms slidably engages the said other end portion of the respective friction shoe member.

6. A clutch and brake mechanism as described in claim 3 in which said friction shoe members are two in number and symmetrically arranged, said spring actuated shifting means being two in number and symmetrically arranged, one for each of said friction shoe members, embodying two symmetrically arranged friction shoe members, and a single fluid operated shifting means with a hydraulic device arranged to simultaneously actuate upon both of the said friction shoe members.

7. A clutch and brake mechanism embodying two axially aligned circular members, friction shoe members including flanges arranged to align with said circular members, a rotary supporting member for said friction shoe members axially aligned with said circular members, spring actuated shifting members for said friction shoe members coupled therewith and mounted on said rotary supporting member, and a single fluid operated shifting member for said friction shoe members arranged in said rotary supporting member, said spring actuated shifting members and said fluid operated shifting member effecting shifting of said friction shoe members in opposite directions to effect selective engagement of the flanges of said friction shoe members with said circular members.

8. A clutch and brake mechanism embodying two axially aligned circular members, friction shoe members including flanges arranged to align with said circular members, a rotary member pivotally supporting the one end portions of said friction shoe members and axially aligned with said circular members, spring actuated lever means pivotally mounted on said rotary supporting means and engaged with the other end portions of said friction shoe members, and a single fluid operated shifting means engaged with the said other end portions of the friction shoe members opposite the area engaged by the said lever means to effect selective shifting of said friction shoe members by said lever means and said fluid operated means for selective engagement of the flanges of said friction shoe members with said circular members.

9. A clutch and brake mechanism as described in claim 8, wherein the fluid operated means embodies two coupled cylinder-piston members the axes of which are rectangularly related to each other, one of said cylinder-piston members being a hydraulic device and including two axially aligned pistons arranged to travel in opposite directions when actuated upon by the liquid in said hydraulic device.

10. A clutch and brake mechanism as described in claim 9, wherein the other one of said cylinder-piston members includes a piston rod extended into the said hydraulic device to effect a ram action during actuation of the fluid operated means.

11. A clutch and brake mechanism embodying two axially aligned circular members, friction shoe members between said members with laterally extended flanges aligned with said circular members, a rotary supporting member for said friction shoe members pivotally supporting the one end portions thereof and axially aligned with said circular members, spring actuated shifting members engaged with the other end portions of said friction shoe members including spring assemblies connected to symmetrically arranged inclined wall portions of said rotary member, and a single fluid operated shifting arrangement mounted on said rotary member in symmetrical relation with respect to said spring assemblies and rectangular relation to the axis of rotation of said rotary member, said fluid operated shifting means including a cylinder-piston device with oppositely arranged piston members engaging the said other end portions of said friction shoe members.

12. A clutch and brake mechanism as described in claim 11, wherein the said cylinder-piston device of said fluid operated shifting device is a hydraulic device actuated upon by an air-pressure operated cylinder-piston arrangement, said arrangement including a piston with a piston rod extended into said hydraulic device to effect its actuation by a ram-like action of said piston rod.

JOHN N. WEILAND.

REFERENCES CITED

The following references are of record in the file of this patent:

UNITED STATES PATENTS

| Number | Name | Date |
|---|---|---|
| 1,643,473 | Ross | Sept. 27, 1927 |
| 2,458,664 | Weiland | Jan. 11, 1949 |

FOREIGN PATENTS

| Number | Country | Date |
|---|---|---|
| 28,246 | Germany | Jan. 13, 1884 |